United States Patent
Lin et al.

(10) Patent No.: US 10,055,366 B2
(45) Date of Patent: Aug. 21, 2018

(54) METHOD FOR DATA TRANSMISSION AND SERVER FOR IMPLEMENTING THE METHOD

(71) Applicant: MITAC COMPUTING TECHNOLOGY CORPORATION, Taoyuan (TW)

(72) Inventors: Chi-Jung Lin, Taoyuan (TW); Chi-Hao Kuan, Taoyuan (TW); Hsiang-Jui Huang, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 0 days.

(21) Appl. No.: 15/446,558

(22) Filed: Mar. 1, 2017

(65) Prior Publication Data

US 2017/0262388 A1    Sep. 14, 2017

(30) Foreign Application Priority Data

Mar. 8, 2016 (TW) .............................. 105106984 A

(51) Int. Cl.
| | |
|---|---|
| *G06F 13/16* | (2006.01) |
| *G06F 13/20* | (2006.01) |
| *G06F 13/40* | (2006.01) |
| *G06F 13/42* | (2006.01) |

(52) U.S. Cl.
CPC .......... *G06F 13/1668* (2013.01); *G06F 13/20* (2013.01); *G06F 13/4068* (2013.01); *G06F 13/4282* (2013.01); *G06F 2213/0026* (2013.01)

(58) Field of Classification Search
CPC ........... G06F 13/385; G06F 2213/0026; G06F 11/0745; G06F 9/4411
USPC ............................................................ 710/9
See application file for complete search history.

(56) References Cited

U.S. PATENT DOCUMENTS

| | | | | |
|---|---|---|---|---|
| 7,660,937 | B2 * | 2/2010 | Frantz | G06F 13/107 710/311 |
| 8,082,440 | B2 * | 12/2011 | Merizan | G06F 8/65 711/150 |
| 9,043,527 | B2 * | 5/2015 | Bhatia | G06F 13/4221 710/313 |
| 9,137,587 | B2 * | 9/2015 | Swaminathan | H04N 21/854 |
| 9,244,872 | B2 * | 1/2016 | Barbiero | G06F 13/4022 |

(Continued)

FOREIGN PATENT DOCUMENTS

| | | |
|---|---|---|
| TW | 588282 | 5/2004 |
| TW | 201209587 A1 | 3/2012 |
| TW | 201525686 A | 7/2015 |

*Primary Examiner* — Brian T Misiura
(74) *Attorney, Agent, or Firm* — Michael Best & Friedrich LLP

(57) ABSTRACT

A method for data transmission within a server that includes a processor, a main memory, a southbridge, a chipset, and a buffer, the chipset including a baseboard management controller (BMC), the method including: obtaining memory information about a segment of the peripheral memory allocated for a peripheral controller included in the chipset; transmitting a notifying command to the BMC indicating a data size of to-be-transmitted data associated with a booting operation of the server; transmitting at least a part of the to-be-transmitted data to the segment, according to the memory information; and transmitting a standby command to the BMC indicating that the part of the to-be-transmitted data has been stored in the segment.

18 Claims, 2 Drawing Sheets

(56) References Cited

U.S. PATENT DOCUMENTS 9,684,517 B2* 6/2017 Chen .................... G06F 9/4406
2017/0220355 A1* 8/2017 Huang ................. G06F 9/3842

* cited by examiner

METHOD FOR DATA TRANSMISSION AND SERVER FOR IMPLEMENTING THE METHOD

CROSS-REFERENCE TO RELATED APPLICATION

This application claims priority of Taiwanese Patent Application No. 105106984, filed on Mar. 8, 2016.

FIELD

The disclosure relates to a method for data transmission, and a server for implementing the method.

BACKGROUND

Demands for server devices have been increasing recently in many aspects of real life. For instance, the Internet, telecommunications, financial services, banking, plastic money, etc. all rely on the computing power and data transmission capabilities of server devices.

In conventional data transmission within a server, a basic input/output system (BIOS) and a baseboard management controller (BMC) play important roles. In practice, the BIOS is capable of transmitting data via a low pin count (LPC) bus which is an interface conforming with a keyboard controller style (KCS) transmission standard. This configuration allows data to be transmitted at a speed of 4 bytes per second.

SUMMARY

One object of the disclosure is to provide a method for data transmission within a server.

According to one embodiment of the disclosure, the server includes a processor, a main memory coupled to the processor, a southbridge coupled to the processor, a chipset coupled to the southbridge, and a peripheral memory coupled to the chipset. The chipset includes a baseboard management controller (BMC). The processor executes a basic input/output system (BIOS) to implement the method comprising steps of:

a) obtaining, from the main memory, memory information about a segment of the peripheral memory allocated for a peripheral controller that is included in the chipset;

b) transmitting a notifying command to the BMC via the southbridge, the notifying command indicating a data size of to-be-transmitted data, the to-be-transmitted data being associated with a booting operation of the server;

c) transmitting at least a part of the to-be-transmitted data to the segment of the peripheral memory, according to the memory information; and d) after step c), transmitting a standby command to the BMC via the southbridge, indicating that the part of the to-be-transmitted data has been stored in the segment of the peripheral memory.

Another object of the disclosure is to provide the server that is capable of implementing the above mentioned method.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
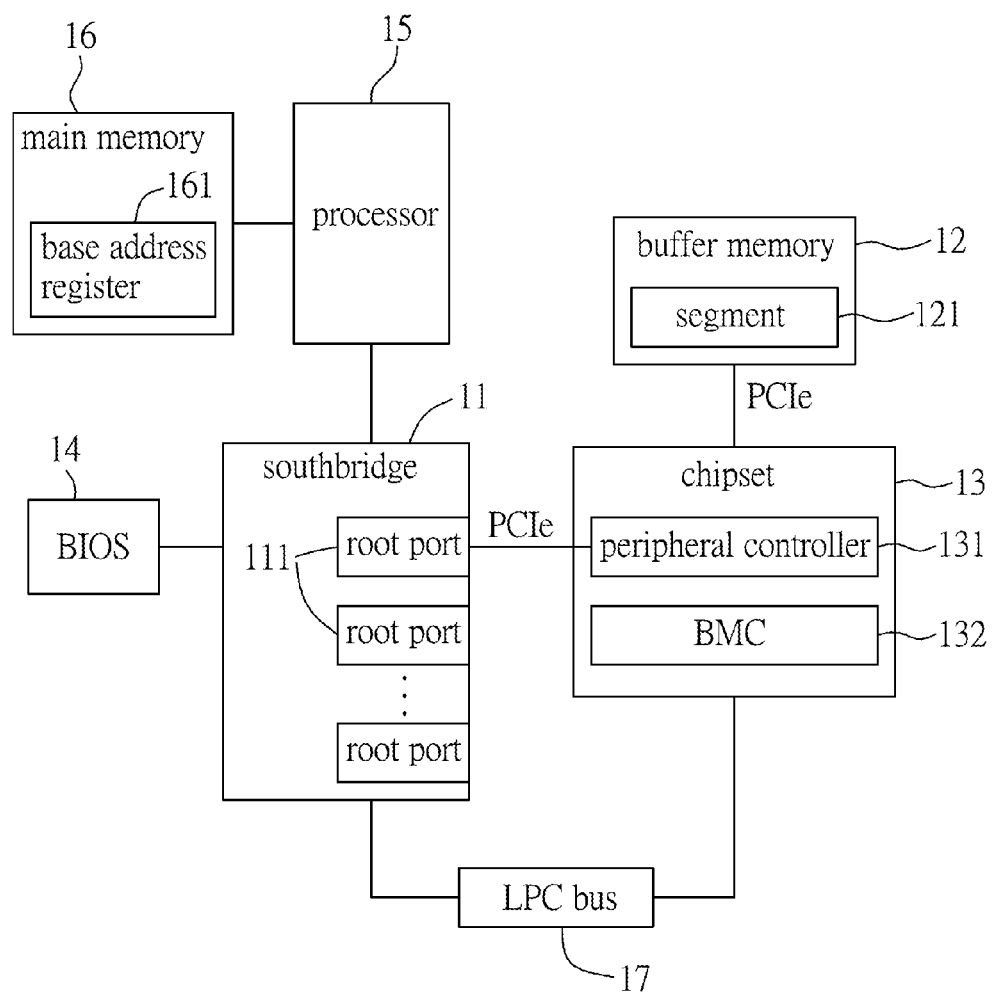
FIG. 1 is a block diagram illustrating a server according to one embodiment of the disclosure.

FIG. 1 is a block diagram illustrating a server according to one embodiment of the disclosure. The server includes a southbridge 11, a peripheral memory 12, a chipset 13, a non-transitory storage medium storing a basic input/output system (BIOS) 14, a processor 15, a main memory 16 and a low pin count (LPC) bus 17.

The southbridge 11 includes a number of root ports 111, and conforms with the peripheral component interconnect express (PCIe) standard. The peripheral memory 12 may be embodied using a double data rate synchronous dynamic random-access memory (DDR2 SDRAM), a double data rate type three (DDR3) SDRAM, etc., and includes a segment 121 that is allocated for a peripheral controller 131 included in the chipset 13.

The chipset 13 is coupled to the southbridge 11 and the peripheral memory 12. The chipset 13 further includes a baseboard management controller (BMC) 132. In this embodiment, the peripheral controller 131 is embodied using an on-board video graphics array (VGA) chip, and is coupled to the southbridge 11 via one of the root ports 111.

The BMC 132 is capable of accessing the segment 121 of the peripheral memory 12, and is capable of transmitting data with the southbridge 11 via the low pin count (LPC) bus 17. The LPB bus 17 conforms with a keyboard controller style (KCS) transmission standard.

The non-transitory storage medium storing the BIOS 14 is coupled to the southbridge 11, and may be embodied using, for example, a flash memory. The BIOS 14 includes instructions that, when executed by the processor 15, cause the processor 15 to perform a power-on self test (POST) after the server is powered on. During the POST, the BIOS 14 may generate various types of data such as system management BIOS data, advanced configuration and power interface (ACPI) data, memory map data (e.g., e820), PCIe advanced error reporting (AER) data, etc. Such data serves as to-be-transmitted data which is to be transmitted to the BMC 132.

The processor 15 may be embodied using a central processing unit (CPU), and is coupled to the southbridge 11 and the main memory 16. The processor 15 is capable of executing the BIOS 14 so as to enable the BIOS 14 to implement various operations.

The main memory 16 includes a base address register 161 that stores a number of address values, including a base address value that is associated with the segment 121 of the peripheral memory 12. The address values enable the BIOS 14 to perform a memory allocation to one or more peripheral devices that are detected by the BIOS 14 (e.g., the peripheral controller 131).

Figure 2:
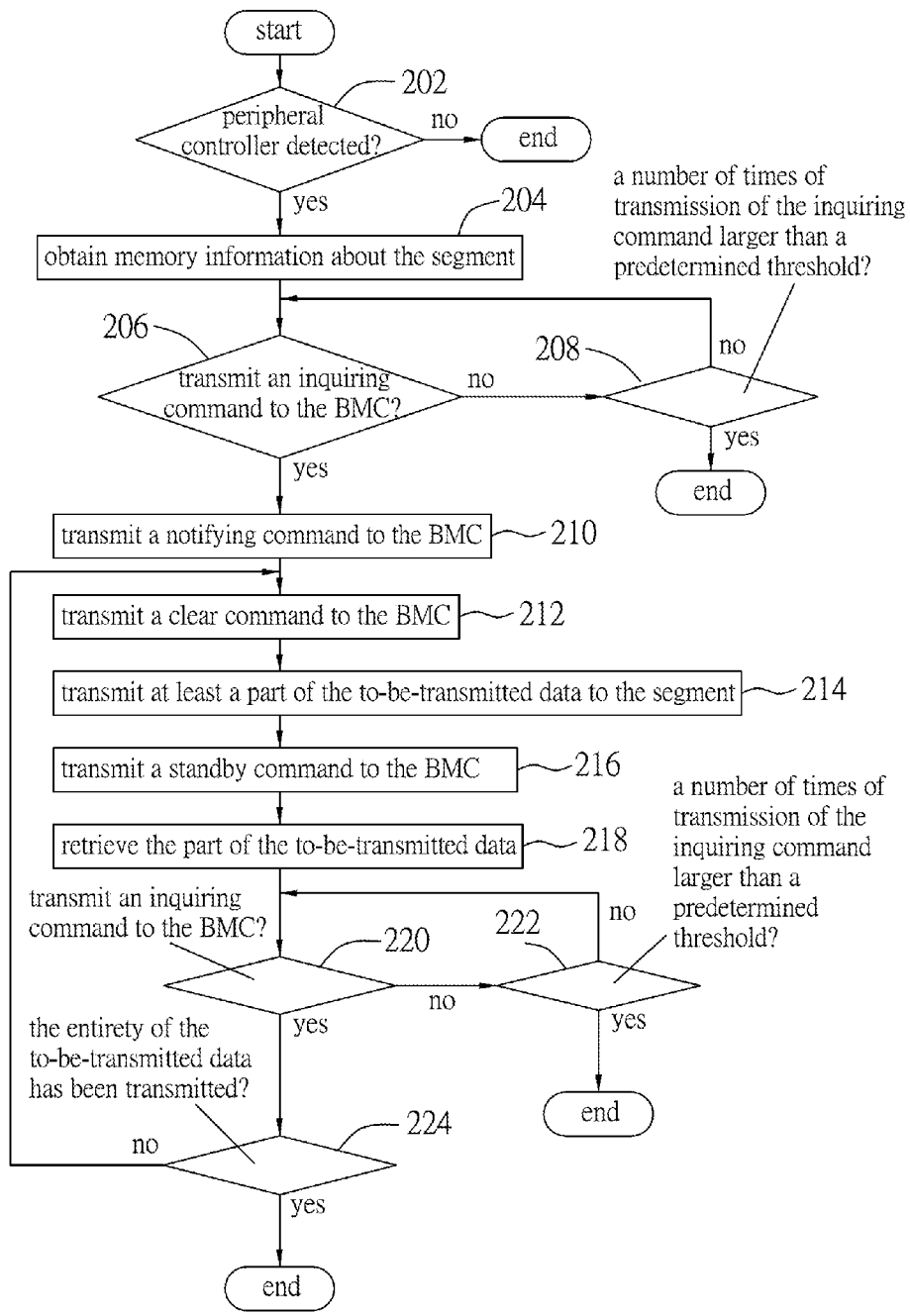
FIG. 2 is a flow chart illustrating a method for data transmission within the server, according to one embodiment of the disclosure.

FIG. 2 is a flow chart illustrating a method for data transmission within the server of FIG. 1, according to one embodiment of the disclosure. In this embodiment, the method is implemented by the processor 15 executing the BIOS 14.

In step 202, the processor 15 detects the peripheral controller 131 in the chipset 13 by reading the root ports 111. The detection of the peripheral controller 131 is done by the processor 15 performing a scanning operation to the root ports 111 during the POST operation. When the peripheral controller 131 is detected, the flow proceeds to step 204. Otherwise, the method is terminated.

In step 204, the processor 15 obtains, from the main memory 16, memory information about the segment 121 of the peripheral memory 12 allocated for the peripheral controller 131 included in the chipset 13.

Specifically, the memory information includes a starting address and a range indicating a memory size of the segment 121 of the peripheral memory 12. The starting address and the range may be dynamically allocated each time the server is powered on. Afterward, the starting address and the range may be mapped to the segment 121 using memory mapped I/O (MMIO) technique. The segment 121 then serves as a buffer for subsequent data transmission. In this embodiment, the memory size is 64 kilobytes.

In step 206, the processor 15 transmits an inquiring command to the BMC 132 via the southbridge 11 and the LPC bus 17. The inquiring command is for inquiring the BMC 132 for a data process status indicating whether the BMC 132 is in an occupied state for processing previous data. The data process status is related to processing the previous data regarding a temperature of the BMC 132, a rotation speed of a fan (not depicted in the drawings), a power supply voltage, etc. When the data process status indicates that the BMC 132 is not in the occupied state, the flow proceeds to step 210. Otherwise, the flow proceeds to step 208. In step 206, the processor 15 transmits an inquiring command to the BMC 132 via the southbridge 11 and the LPC bus 17. The inquiring command is for inquiring the BMC 132 for a data process status indicating whether the BMC 132 is in an occupied state for processing previous data. The data process status is related to processing the previous data regarding a temperature of the BMC 132, a rotation speed of a fan (not depicted in the drawings), a power supply voltage, etc. When the data process status indicates that the BMC 132 is not in the occupied state, the flow proceeds to step 210. Otherwise, the flow proceeds to step 208.

In step 208, the processor 15 determines whether a number of times of transmission of the inquiring command is larger than a predetermined threshold (e.g., 5 times). When it is determined that the number of times of transmission is larger than the predetermined threshold, the method is terminated. Otherwise, the flow goes back to step 206. That is to say, the operation of data transmission commences when the BMC 132 is not in the occupied state.

In step 210, the processor 15 transmits a notifying command to the BMC 132 via the southbridge 11 and the LPC bus 17. The notifying command indicates a data size of the to-be-transmitted data. In one example, the data size is 140 kilobytes. In another example, the data size is 5 kilobytes.

In step 212, the processor 15 transmits a clear command to the BMC 132 via the southbridge 11 and the LPC bus 17. The clear command is for controlling the BMC 132 to clear data stored in the segment 121 of the peripheral memory 12, thereby allowing data to be stored in the segment 121 later.

In step 214, the processor 15 transmits at least a part of the to-be-transmitted data to the segment 121 of the peripheral memory 12, according to the memory information. Specifically, the part of the to-be-transmitted data having a size not greater than the memory size (e.g., 64 kilobytes) is transmitted from the southbridge 11 to the segment 121 of the peripheral memory 12. For example, for the to-be-transmitted data having a 140 kilobyte-size, the first 64 kilobytes may be transmitted. For to-be-transmitted data having a 5 kilobyte-size, the entire 5 kilobytes may be transmitted. It is noted that the transmission of the part of the to-be-transmitted data may be implemented by interfaces that conform with the PCIe standard. In this embodiment, the server includes an interface that interconnects the chipset 13 and the peripheral memory 12. The interface is a bus that conforms with the peripheral component interconnect express (PCIe) standard.

Afterward, the processor 15 stores in the segment 121 the part of the to-be-transmitted data that has been transmitted, starting from the starting address included in the memory information. Additionally, the processor 15 records a total transmitted data amount of data that has been stored in the segment 121 of the peripheral memory 12. For example, for the to-be-transmitted data having a 140 kilobyte-size, the total transmitted data amount is 64 kilobytes after one data transmission. For to-be-transmitted data having a 5 kilobyte-size, the total transmitted data amount is 5 kilobytes.

Then, in step 216, the processor 15 transmits a standby command to the BMC 132 via the southbridge 11 and the LPC bus 17. The standby command indicates that the part of the to-be-transmitted data has been stored in the segment 121 of the peripheral memory 12. The standby command transmitted to the BMC 132 enables the BMC 132 to access the part of the to-be-transmitted data from the segment 121.

In response to receipt of the standby command, in step 218, the BMC 132 retrieves from the starting address of the segment 121 the part of the to-be-transmitted data based on the data size included in the notifying command. For example, in the case of the notifying command indicating the to-be-transmitted data having the data size of 5 kilobytes, the BMC 132 retrieves 5 kilobytes of data from the starting address of the segment 121. In another case of the notifying command indicating the to-be-transmitted data having the data size of 140 kilobytes, the BMC 132 determines that the data size is greater than the memory size of the segment 121, and retrieves 64 kilobytes of data, which is equal to the memory size of the segment 121, from the segment 121. As a result, the BMC 132 may retrieve data in the segment 121, starting from the starting address and having a size associated with the total transmitted data amount (64 or 5 kilobytes).

In step 220, the processor 15 transmits an inquiring command to the BMC 132 via the southbridge 11 and the LPC bus 17 for inquiring the BMC 132 for the data process status. It is noted that operation in step 220 is similar to that in step 206. When the data process status indicates that the BMC 132 is not in the occupied state, the flow proceeds to step 222. Otherwise, the flow proceeds to step 224.

In step 222, the processor 15 determines whether a number of times of transmission of the inquiring command is larger than the predetermined threshold. When it is determined that the number of times of transmission is larger than the predetermined threshold, the method is terminated. Otherwise, the flow goes back to step 220.

In step 224, the processor 15 determines whether the entirety of the to-be-transmitted data has been transmitted.

Specifically, the determination may be made by comparing the total transmitted data amount, which is recorded after the transmission of the part of the to-be-transmitted data in step 214, to the data size of the to-be-transmitted data, which is indicated by the notifying command. The processor 15 determines that the entirety of the to-be-transmitted data has been transmitted when the total transmitted data amount equals the data size of to-be-transmitted data.

For example, when the data size is 5 kilobytes, and the total transmitted data amount is 5 kilobytes after one transmission, the processor 15 determines that the entirety of the to-be-transmitted data has been transmitted. In such a case, the method is terminated.

In another example, when the data size is 140 kilobytes, and the total transmitted data amount is 64 kilobytes after one transmission, the processor 15 determines that not the entirety of the to-be-transmitted data has been transmitted. In such a case, the flow goes back to step 212, in which the segment 121 is cleared for accommodating another data transmission.

Steps 212 to 218 will then be repeated for transmitting another part of the to-be-transmitted data (i.e., 65th-128th kilobytes).

Afterward, the determination in step 220 results in the flow proceeding to step 224, and since the data size is 140 kilobytes, and the total transmitted data amount is 128 kilobytes after two transmissions, the processor 15 determines that not the entirety of the to-be-transmitted data has been transmitted. Therefore, the flow would go back to step 212 again, for transmitting a remaining part of the to-be-transmitted data (i.e., 129th-140th kilobytes). Then, in step 224, the processor 15 determines that the entirety of the to-be-transmitted data has been transmitted.

To sum up, the server and the method for transmitting data within the server provide an efficient way to transmit the to-be-transmitted data to the BMC 132. Specifically, the BMC 132 is capable of accessing the segment 121 of the peripheral memory 12, which is typically allocated for use by the peripheral controller 131, at a higher frequency (e.g., the DDR2 or DDR3 may have an operating frequency of 400 MHz), and therefore the transmission of data may have a speed around 1600 megabytes per second. This is a marked improvement over the transmission via the LPC bus 17, which transmits data at a speed of around 4 bytes per second.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure . It should be further appreciated that in the description, various features are sometimes grouped together in a single embodiment, figure, or description thereof for the purpose of streamlining the disclosure and aiding in the understanding various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for data transmission within a server, the server including a processor, a main memory coupled to the processor, a southbridge coupled to the processor, a chipset coupled to the southbridge, and a peripheral memory coupled to the chipset, the chipset including a baseboard management controller (BMC), the processor executing a basic input/output system (BIOS) to implement the method comprising steps of:

a) obtaining, from the main memory, memory information about a segment of the peripheral memory allocated for a peripheral controller that is included in the chipset;
   b) transmitting a notifying command to the BMC via the southbridge, the notifying command indicating a data size of to-be-transmitted data, the to-be-transmitted data being associated with a booting operation of the server;
   c) transmitting at least a part of the to-be-transmitted data to the segment of the peripheral memory, according to the memory information; and
   d) after step c), transmitting a standby command to the BMC via the southbridge, indicating that the part of the to-be-transmitted data has been stored in the segment of the peripheral memory;
   wherein the memory information includes a starting address and a range indicating a memory size of the segment of the peripheral memory, and step c) includes transmitting the part of the to-be-transmitted data that has a size not greater than the memory size, and storing the same in the segment of the peripheral memory according to the starting address.

2. The method of claim 1, the southbridge including a root port to be connected to the peripheral controller of the chipset, wherein the method further comprises detecting the peripheral controller in the chipset by reading the root port, and executing step a) upon detecting the peripheral controller.

3. The method of claim 1, further comprising, after step a), steps of:
   transmitting an inquiring command to the BMC via the southbridge, for inquiring the BMC for a data process status;
   when the data process status indicates that the BMC is in the occupied state, determining whether a number of times of transmission of the inquiring command is larger than a predetermined threshold;
   wherein step b) is executed when the data process status indicates that the BMC is not in an occupied state; and
   transmitting the inquiring command to the BMC again via the southbridge when it is determined that the number of times of transmission of the inquiring command is not larger than the predetermined threshold.

4. The method of claim 1, wherein the standby command transmitted to the BMC in step d) enables the BMC to access the part of the to-be-transmitted data from the segment of the peripheral memory.

5. The method of claim 4, further comprising, after step d), steps of:
   transmitting an inquiring command to the BMC via the southbridge, for inquiring the BMC for a data process status;
   when the data process status indicates that a previous data process operation associated with the BMC has not been completed, determining whether a number of times of transmission of the inquiring command to the BMC is larger than a predetermined threshold; and
   transmitting the inquiring command to the BMC again via the southbridge when it is determined that the number of times of transmission of the inquiring command is not larger than the predetermined threshold.

6. A method for data transmission within a server, the server including a processor, a main memory coupled to the processor, a southbridge coupled to the processor, a chipset coupled to the southbridge, and a peripheral memory coupled to the chipset, the chipset including a baseboard management controller (BMC), the processor executing a basic input/output system (BIOS) to implement the method comprising steps of:
  a) obtaining, from the main memory, memory information about a segment of the peripheral memory allocated for a peripheral controller that is included in the chipset;
  b) transmitting a notifying command to the BMC via the southbridge, the notifying command indicating a data size of to-be-transmitted data, the to-be-transmitted data being associated with a booting operation of the server;
  c) transmitting at least a part of the to-be-transmitted data to the segment of the peripheral memory, according to the memory information; and
  d) after step c), transmitting a standby command to the BMC via the southbridge, indicating that the part of the to-be-transmitted data has been stored in the segment of the peripheral memory,
  wherein the method further comprises, before step c), step of
  e) transmitting a clear command to the BMC via the southbridge for controlling the BMC to clear data stored in the segment of the peripheral memory.

7. The method of claim 6, further comprising, after step e), steps of:
  f) determining whether the entirety of the to-be-transmitted data has been transmitted; and
  g) when it is determined that not the entirety of the to-be-transmitted data has been transmitted, repeating steps e), c) and d) for transmitting another part of the to-be-transmitted data.

8. The method of claim 7, wherein:
  step c) includes transmitting the part of the to-be-transmitted data, storing the part of the to-be-transmitted data into the segment of the peripheral memory, and then recording a total transmitted data amount of data that has been stored in the segment of the peripheral memory;
  step f) includes comparing the total transmitted data amount to the data size of the to-be-transmitted data, and determining that the entirety of the to-be-transmitted data has been transmitted when the total transmitted data amount equals to the data size of to-be-transmitted data.

9. The method of claim 1, wherein the to-be-transmitted data is generated by the BIOS during a power-on self-test (POST) of the server, and includes one or more of system management BIOS data, advanced configuration and power interface (ACPI) data, memory map data, and peripheral component interconnect express (PCIe) advanced error reporting (AER) data.

10. The method of claim 1, the southbridge including a number of root ports that conform with the peripheral component interconnect express (PCIe) standard, wherein in step c), transmission of the part of to-be-transmitted data is implemented by interfaces that conform with the PCIe standard.

11. A server comprising:
  a processor;
  a main memory coupled to said processor;
  a southbridge coupled to said processor;
  a chipset coupled to said southbridge, said chipset including a baseboard management controller (BMC) and a peripheral controller;
  a peripheral memory coupled to said chipset; and
  a non-transitory storage medium storing a basic input/output system (BIOS) therein;
  wherein the BIOS includes instructions that, when executed by said processor, cause the processor to:
    obtain, from said main memory, memory information about a segment of said peripheral memory allocated for said peripheral controller,
    transmit a notifying command to the BMC via said southbridge, the notifying command indicating a data size of to-be-transmitted data, the to-be-transmitted data being associated with a booting operation of said server,
    transmit at least a part of the to-be-transmitted data to said segment of said peripheral memory, according to the memory information, and
    transmit a standby command to the BMC via said southbridge, indicating that the part of the to-be-transmitted data has been stored in said segment of said peripheral memory;
  wherein the memory information includes a starting address and a range indicating a memory size of said segment of said peripheral memory, and said processor is caused to transmit the at least a part of the to-be-transmitted data by transmitting the part of the to-be-transmitted data that has a size not greater than the memory size, and storing the part of the to-be-transmitted data into said segment of said peripheral memory according to the starting address.

12. The server of claim 11, wherein said BIOS further includes instructions that, when executed by said processor, cause said processor to:
  transmit an inquiring command to said BMC via said southbridge, for inquiring said BMC for a data process status;
  transmit the notifying command when the data process status indicates that said BMC is not in an occupied state;
  when the data process status indicates that said BMC is in the occupied state, determine whether a number of times of transmission of the inquiring command is larger than a predetermined threshold; and
  transmit the inquiring command to said BMC again via said southbridge when it is determined that the number of times of transmission of the inquiring command is not larger than the predetermined threshold.

13. The server of claim 11, wherein said peripheral controller is a video graphics array (VGA) chip.

14. The server of claim 11, wherein:
  said southbridge includes a root port to be connected to said peripheral controller of said chipset;
  said BIOS further includes instructions that, when executed by said processor, cause said processor to detect said peripheral controller in said chipset by reading the root port, and to obtain the memory information upon detecting said peripheral controller.

15. The server of claim 11, wherein said BIOS further includes instructions that, when executed by said processor, cause said processor to:
  prior to the transmitting of the at least a part of the to-be-transmitted data, transmit a clear command to said BMC via said southbridge for controlling said BMC to clear data stored in said segment of said peripheral memory.

16. The server of claim 15, wherein said BIOS further includes instructions that, when executed by said processor, cause said processor to:
  determine whether the entirety of the to-be-transmitted data has been transmitted; and when it is determined that not the entirety of the to-be-transmitted data has been transmitted, transmit another part of the to-be-transmitted data.

17. The server of claim 11, wherein the to-be-transmitted data is generated by said BIOS during a power-on self-test (POST) of said server, and includes one or more of system management BIOS data, advanced configuration and power interface (ACPI) data, memory map data, and peripheral component interconnect express (PCIe) advanced error reporting (AER) data.

18. The server of claim 11, wherein:
said southbridge conforms with the peripheral component interconnect express (PCIe) standard;
the server further comprises an interface that interconnects said chipset and said peripheral memory, that conforms with the PCIe standard, and that is for transmitting the part of to-be-transmitted data.

* * * * *